United States Patent [19]
Pennell

[11] 3,883,011
[45] May 13, 1975

[54] HOPPER INSTALLATION

[75] Inventor: Anthony Robin Pennell, Gravesend, England

[73] Assignee: The Associated Portland Cement Manufacturers Limited, London, England

[22] Filed: Mar. 14, 1973

[21] Appl. No.: 341,062

[30] Foreign Application Priority Data
Mar. 14, 1972 United Kingdom............. 11777/72

[52] U.S. Cl.............. 214/17 B; 214/152; 214/17 D
[51] Int. Cl............................................ B65g 65/30
[58] Field of Search.... 214/17 R, 17 D, 17 A, 17 C, 214/16 R, 15 C, 17 B, 152; 209/134, 136, 138, 147

[56] References Cited
UNITED STATES PATENTS

| | | | |
|---|---|---|---|
| 2,052,646 | 9/1936 | Osgood | 214/17 R X |
| 2,617,531 | 11/1952 | Palmer | 209/147 |
| 3,405,820 | 10/1968 | Mori | 214/17 B |

FOREIGN PATENTS OR APPLICATIONS

| | | | |
|---|---|---|---|
| 739,043 | 10/1955 | United Kingdom | 214/17 C |

Primary Examiner—Frank E. Werner
Attorney, Agent, or Firm—Baldwin, Wight & Brown

[57] ABSTRACT

A method of and apparatus for handling grab-unloaded particulate material in a hopper installation comprises passing the grab through an intake section open at the top and into a discharge chamber at its lower end of enlarged cross-sectional area.

In one arrangement dust-laden air is withdrawn from said chamber through outlet ports by an extractor to create a circulatory air flow therein and set up in the central zone a partial vacuum.

In a second arrangement the dust-laden air is recirculated through inlet and outlet ports thus maintaining a central zone at neutral pressure.

By effecting discharge of the grab in the central zone the dust-laden air is substantially confined within the hopper body.

The apparatus can be operated at lower rates of air extraction not substantially exceeding 12,000 cu.ft/min.

13 Claims, 4 Drawing Figures

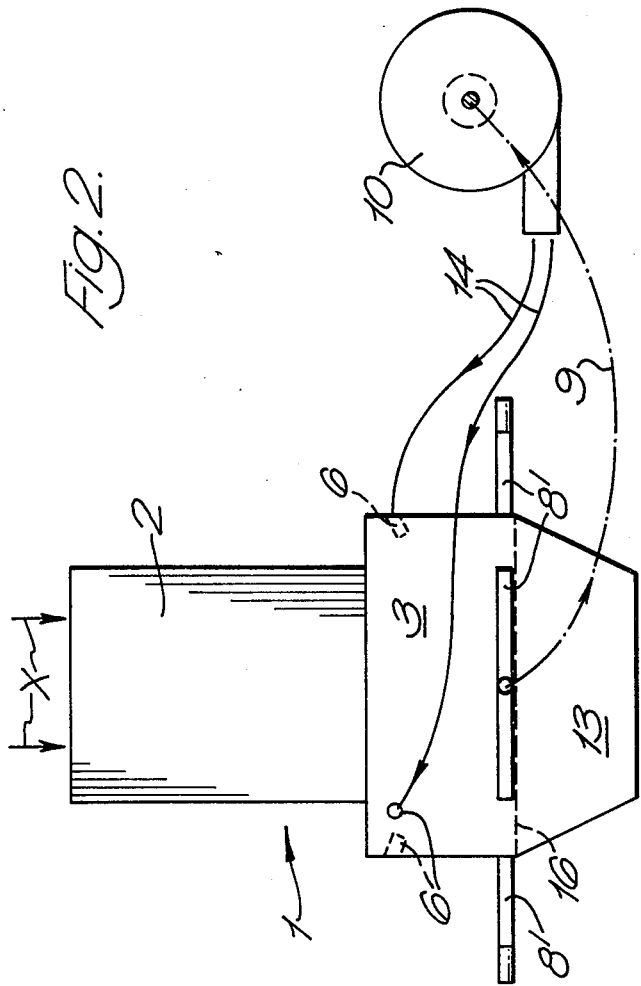

HOPPER INSTALLATION

This invention relates to a hopper installation for the dust-free reception of grab-unloaded material of a powdery or friable nature and other particulate materials containing a fine dust fraction.

Conventional hoppers designed to reduce dust clouds on the release of material from a grab into a hopper are of two main types:

a. Air curtain types with straight sides in which air is blown across at high pressure inside the top section of the hopper to contain dust within the hopper. The disadvantages of this type are:
  1. A large volume of high pressure air has to be provided and the total amount of air has to be removed and filtered at the dust plant.
  2. The high pressure air blows dust from the grab on its descent and return thus creating a dust cloud and defeating the object of the arrangement.

b. Types provided with rubber flaps at the top of the hopper and a hood provided above the hopper with dust extraction points. The disadvantages of this type of hopper are:
  1. A large volume of air of the order of 30–50,000 ft$^3$/min. has to be removed continuously at the hood.
  2. Maintenance problems of rubber flaps.
  3. Difficult to contrive clear view from the crane operator because of the hood, thus inhibiting the attainment of the conventional capacity of the crane.

According to the present invention a hopper installation for handling particulate materials containing a fine dust fraction comprises:

i. a hopper body having an elongated intake section which is open at its upper end and provides an unobstructed passage for introduction, when in use, of a grab or bucket containing material to be discharged and at its lower end opens into a discharge chamber of increased cross-section, and ii. air extraction means for withdrawing dust-laden air from the wall area of said chamber to produce an air flow pattern surrounding a neutral or negative pressure inner zone of the chamber, into which the grab or bucket can be lowered to release its contents.

In a preferred embodiment of the invention, peripherally spaced ports are provided in the wall perimeter or each of the walls of the chamber, the ports being connected by pipeline to an air extractor and by means of which a negative pressure is built up within the chamber.

In another embodiment of the invention, the discharge chamber has both air inlet and air outlet ports located respectively in the upper and lower wall areas of the chamber and symmetrically arranged around the perimeter thereof, by which dust-laden air is recirculated from an outlet port or ports to an inlet port or ports.

By providing a number of oppositely located ports around the perimeter of the chamber it is possible to maintain a continuous recirculation of the dust-laden air in a generally downwards direction, which by directing nozzles for the return flow at an angle to the horizontal will enhance the toroidal pattern of air flow around the side wall or walls of the chamber.

In this embodiment of the invention means may be provided for extracting at least a proportion of the volume of dust-laden air in circulation from the hopper installation so as to induce a positive in-flow of atmospheric air through the intake section into the hopper.

It will be appreciated that by causing an induced air flow through the hopper intake section it serves also to counteract air displacement caused by the entry and withdrawal of the grab, which might otherwise cause the escape of very fine air-borne dust to the atmosphere.

The hopper body including the upper intake section and discharge chamber may be circular or rectangular in horizontal cross-section although in practice a rectangular cross-section is preferred because of simplicity of manufacture. A grid may be provided at the intersection between the lower end of the discharge chamber and a bottom discharge section, which is preferably tapered, in order to operate a device fitted to the grab so that it cannot be discharged until the grab has actually touched the grid. By fitting a grab locking device it prevents the crane operator from discharging the particulate matter from the grab at the top of the hopper thus defeating the purpose of the invention.

Circulation of air may be effected by coupling the outlet ports to the intake of a circulating fan which on the discharge or output side is connected to the inlet ports.

The invention is diagrammatically illustrated in the accompanying drawings, in which:

FIG. 2 is a view in elevation of a second embodiment of the invention;

Figure 1:
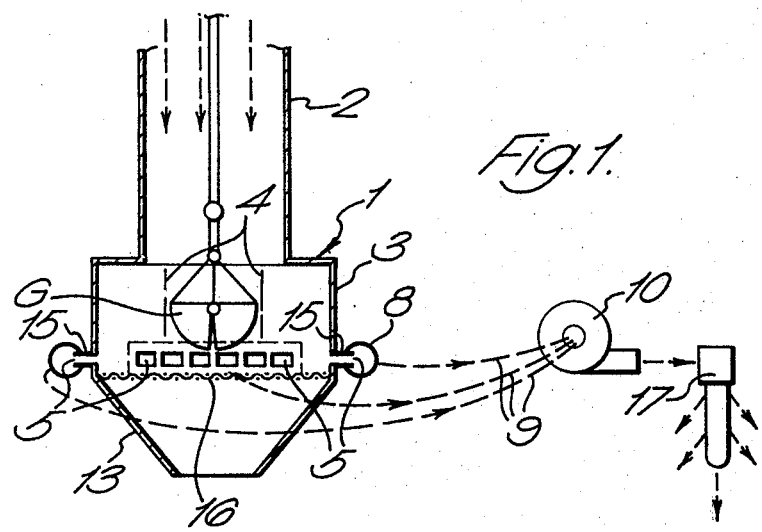
FIG. 1 is a view in section of a hopper installation constructed in accordance with a preferred embodiment of the invention and showing also the grab on being lowered into the hopper.

Referring to FIG. 1 of the drawings, the hopper installation of this invention comprises a hopper body, indicated at 1, having an elongated intake or throat section 2 which is unobstructed throughout its length and open at its upper end for introduction of a grab or bucket G containing the cement or other finely divided or particulate material to be processed, section 2 opening into a lower section 3, hereinafter referred to as the discharge chamber.

Chamber 3 as can be seen is of increased cross-section and it is within this chamber that the material is released from the grab, the chamber having outlet ports 5 through which air is withdrawn to maintain the chamber under partial vacuum. The outlet-ports are arranged to set up a circular air flow pattern within the chamber with the object of creating a neutral central zone, indicated in dotted lines at 4, with the result that it becomes a no-flow area.

For convenience in construction the hopper may be made up from rectangular units, the extraction ports, indicated generally at 5, extending across a substantial part of the width of each side wall, each port being subdivided into a number of boxed openings 15 connecting with extractor ducts 8, the ducts 8 being coupled by pipes 9 leading to air extracting means, conveniently a main fan 10 driven, e.g. by an electric motor 11 (see FIG. 3). 17 is a dust filter unit.

It has been found that by maintaining a neutral or negative pressure zone 4 into which the grab is lowered by the operator and such that discharge of material mainly takes place beneath the level of the outlets, the dust-laden air set up on release can be confined to the interior of the chamber.

The lower end of chamber 3 is of inverted conical section 13, and at the intersection there is preferably provided, as shown, a grid 16 of relatively large mesh through which the material is free to fall to the bottom outlet. Grid 16 serves mainly as a reinforcement to impart rigidity to the structure but also provides a tell-tale for the operator for actuating the grab G to release its contents. Thus the metal grid 16 can be used to give an audible signal to the operator, i.e. when the bucket hits the grid to release the contents or a trip on the grid can actuate a visual or audible signalling device by which the bucket is directly, or indirectly by a manually operated control, caused to open to discharge its contents.

Figure 3:
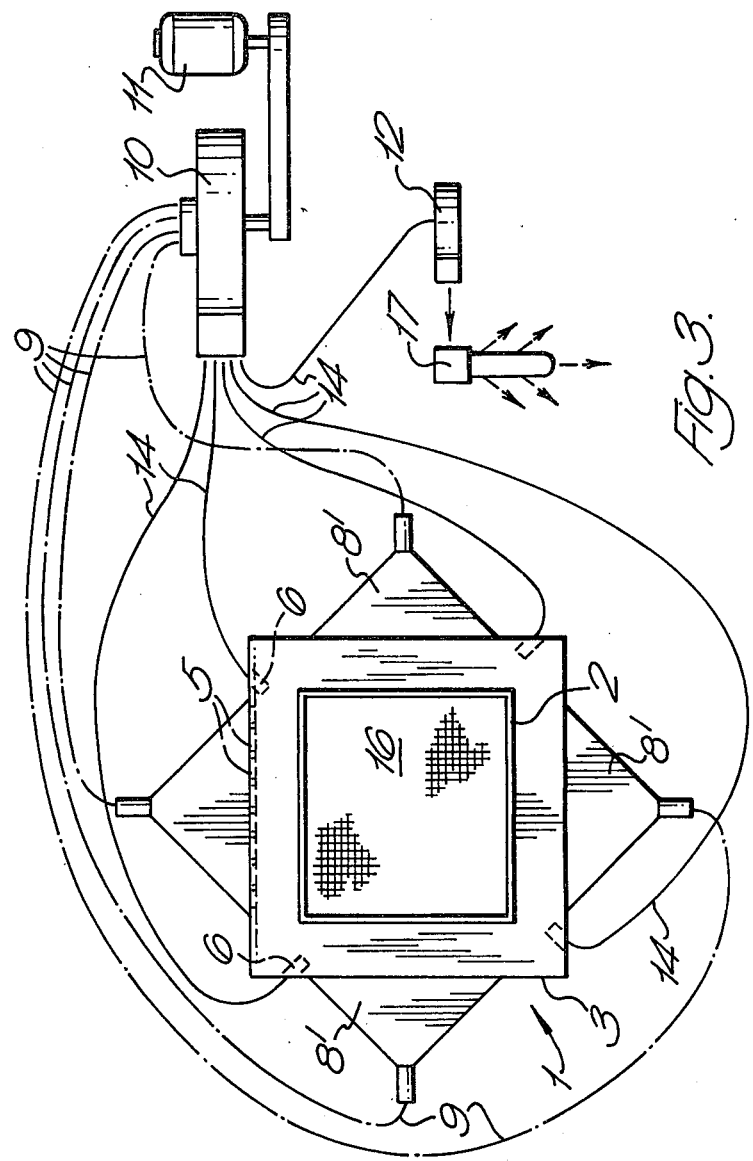
FIG. 3 is a plan view of the hopper shown in FIG. 2 having a modified form of air recirculation.

Referring to FIGS. 2 and 3, the chamber 3 is in addition provided with inlet ports 6 for introduction of recirculated dust-laden air withdrawn through the extractor ducts 8', which in this embodiment are of fishtail shape. Return flow pipes 14 from the discharge side of fan 10 convey the recirculated dust containing air to inlet ports 6.

In the modified installation shown in FIG. 3, a bleed extractor fan 12 is connected to the outlet side of the main circulating fan 10 and serves to bleed off a proportion of the circulating dust-laden air. This proportion of air is passed to a dust filter unit 17. The extraction of air from the circulating system causes an induced flow of atmospheric air as indicated by arrows X in FIG. 2 to be drawn into the hopper from the top, thus reducing still further the possibility of dust escaping from the hopper.

Figure 4:
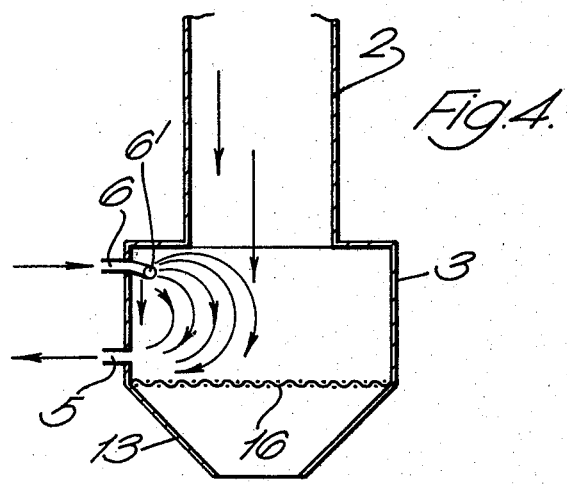
FIG. 4 is an explanatory view.

Referring to FIG. 4, this shows the generally toroidal air flow pattern which is achieved within the chamber 3 when provided with inlet and outlet ports as shown in FIGS. 2 and 3.

The hopper construction of FIG. 1 has the advantage that an air flow pattern can be induced within the chamber in which the air continuously circulates in a generally downward direction around the perimeter of the chamber with the result that in the centre of the chamber there is a neutral pressure zone.

In the arrangement shown in FIGS. 2–4 in which the chamber has both inlet and outlet ports the air flow between these ports sets up a toroidial flow pattern as shown in FIG. 4, except that in the case of the FIG. 2 arrangement there is no deliberately induced air flow through the intake section. However, in the embodiment shown in FIG. 3, by removing some of the recirculating air a small inflow of air is continuously induced through the intake section.

Under favourable conditions, in operating the installation of FIG. 1 in which there is nil-return of dusty air to the hopper, considerable reduction in the quantity of air extracted with consequent saving in plant costs and equipment can be effected, tests having shown that the maximum rate of air withdrawal will not exceed 12,000 cu.ft./min. In an installation of standard size it proved sufficient to withdraw only a small amount of air of the order of 6,000 ft$^3$/min. as against the 30–50,000 ft$^3$/min. of conventional types normally taken to the dust removal plant via the extractors. The operation envisaged above is employed when the desired air circulation patterns are naturally induced by the material discharged from the grate. Therefore it is only necessary under these circumstances to induce air flow through the hopper intake section to counteract air displacement caused by the entry and withdrawal of the grab.

What is claimed is:

1. In a hopper installation for handling particulate material containing a fine dust fraction comprising a hopper body which is open at its upper end to receive a grab containing material to be discharged, the hopper having a bottom discharge opening, the improvement in which the hopper body comprises an elongated intake section which is open at its upper end and which is connected at its lower end with and opens into a discharge chamber of increased cross section, said intake section providing an unobstructed passage for introduction therethrough into the chamber of the grab containing material to be discharged, and air extracting means connected to said chambers for withdrawing air from the wall area of said chamber to produce an air flow pattern surrounding a neutral or negative pressure central zone of minimum flow therein within which the grab or bucket can be lowered to release its contents.

2. A hopper installation as claimed in claim 1, wherein the discharge chamber has ports provided in the wall thereof, said ports being connected by a pipeline to an air extractor and being peripherally spaced to produce said air flow pattern.

3. In a hopper installation for handling particulate materials containing a fine dust fraction comprising a hopper body which is open at its upper end to receive a grab containing material to be discharged, the hopper having a bottom discharge opening, the improvement in which the hopper body comprises an elongated intake section which is open at its upper end and which is connected at its lower end with and opens into a discharge chamber of increased cross-section, said intake section providing an unobstructed passage for introduction therethrough of the grab containing material to be discharged, air inlet and air outlet ports located respectively in upper and lower wall areas of the chamber and arranged symmetrically with respect to each other; and air extraction means including pipelines connected to said outlet ports for withdrawing air from said chamber and pipelines connected to said inlet ports for recirculating the withdrawn air through said chamber to produce an air flow pattern surrounding a neutral pressure zone within the chamber into which the grab can be lowered to release its contents.

4. A hopper installation as claimed in claim 3 in which each outlet port is provided with a series of transversely extending boxed apertures.

5. A hopper installation as claimed in claim 3 in which the inlet ports include pipes projecting downwardly into the chamber so as to induce a toroidal pattern of air flow within the chamber.

6. A hopper installation as claimed in claim 3, in which the means for circulating dust-laden air includes a fan whose inlet side is connected to each outlet port and whose outlet side is connected to each inlet port.

7. A hopper installation is claimed in claim 3, in which the chamber is provided with an open-meshed grid located beneath the outlet ports for cooperation with the grab to initiate opening thereof.

8. In a hopper installation for handling particulate materials containing a fine dust fraction comprising a hopper body which is open at its upper end to receive a grab containing material to be discharged, the hopper having a bottom discharge opening, the improvement in which the hopper body comprises an elongated intake section which is open at its upper end and which is connected at its lower end with and opens into a discharge chamber of increased and rectangular cross-section, said intake section providing an unobstructed passage for introduction therethrough of the grab containing material to be discharged, four air inlet ports are located at the corners of the chamber and four air outlet ports are placed centrally of the wall areas of the chamber; and air extraction means including pipelines connected to said outlet ports for withdrawing air from said chamber and pipelines connected to said inlet ports for recirculating the withdrawn air through said chamber to produce an air flow pattern surrounding a neutral pressure zone within the chamber into which the grab can be lowered to release its contents.

9. A hopper installation as claimed in claim 8 further comprising means for extracting at least a proportion of the volume of dust-laden air in circulation from the hopper installation so as to induce a positive in-flow of atmospheric air into the hopper.

10. A hopper installation as claimed in claim 8 in which each inlet port is placed laterally between two outlet ports.

11. A method of handling particulate material containing a fine dust fraction in a hopper installation, comprising the steps of:
  a. passing a grab, loaded with the particulate material, through an elongated intake section of restricted area into an inner hopper chamber having a greater transverse area than that of the intake section;
  b. withdrawing dust-laden air from said chamber in such a manner as to set up an inner zone within said chamber at a neutral or negative pressure;
  c. releasing particulate material from said grab within said zone;
  d. recirculating to the chamber dust-laden air withdrawn therefrom.
  e. removing part of the circulating dust-laden air from circulation in the hopper installation so as to induce a positive in-flow of atmospheric air into the hopper; and,
  f. removing dust from the removed part of the circulating dust-laden air, and thereafter discharging the removed part of the air to the atmosphere.

12. A method of discharging particulate materials containing a fine dust fraction from a grab into a hopper, comprising the steps of:
  a. providing within a hopper a chamber of relatively wide cross-section for discharge into a central zone above a predetermined level therein of particulate material from a loaded grab;
  b. further providing an elongated hopper intake passage of relatively narrow cross-section opening at its lower end into said chamber and open at it upper end to receive a grab;
  c. withdrawing air from around the wall area of said chamber immediately above said level and thereby maintaining around the inside of said chamber a pattern of flowing air characterized by a generally downward current of air adjacent and circumscribing said central zone and leaving in said central zone relatively still air at neutral or negative pressure;
  d. lowering a grab loaded with said particulate material through said elongated passage and into said central zone within said chamber until said predetermined level is reached, discharging the contents of the grab into the chamber and subsequently withdrawing the grab from the hopper through the elongated passage;
  e. with dust arising from said discharging being confined within the system.

13. A method according to claim 12, wherein said pattern of flowing air is maintained toroidal by recirculation through external piped means.

* * * * *